United States Patent [19]

Petrille, III et al.

[11] Patent Number: 5,518,636
[45] Date of Patent: May 21, 1996

[54] METHODS OF DETOXIFYING QUATERNARY AMMONIUM COMPOUNDS TOWARD AQUATIC ORGANISMS

[75] Inventors: Joseph C. Petrille, III, North Wales; Michael W. Werner, Warrington, both of Pa.

[73] Assignee: Betz Laboratories, Inc., Trevose, Pa.

[21] Appl. No.: 426,515

[22] Filed: Apr. 21, 1995

[51] Int. Cl.⁶ .................................. C02F 1/00; C02F 1/66
[52] U.S. Cl. ............................................. 210/749; 210/764
[58] Field of Search ................................. 210/749, 764

[56] References Cited

U.S. PATENT DOCUMENTS

| | | | |
|---|---|---|---|
| 3,524,812 | 8/1970 | Shema et al. | 210/63 |
| 4,204,954 | 5/1980 | Jacob | 210/59 |
| 5,169,536 | 12/1992 | Vasconcellos et al. | 210/691 |

OTHER PUBLICATIONS

Quisno, R., Gibby, I. W. and Foter, M. J. (1946) "A Neutralizing Medium for Evaluating the Germicidal Potency of the Quaternary Ammonium Salts". Am. J. Pharm. vol. 118:32–32.3.

Stuart, L. S. (1947) NAIDM–USDA Report on Quaternary Ammonium Testing, Soap Sanit. Chemicals, vol. 23:135.

Armbruster, E. H. and Ridenour, G. M. (1947) A New Medium for Study for Quaternary Bactericides. Coap Santi. Chemicals, vol. 23:119.

Lawrence, C. A. (1950) Surface–Active Quaternary Ammonium Germicides. Academic Press, Inc., New York.

Deluca, P. and Kostenbauder, H. B. (1959) Interaction of Preservatives With Macromolecules IV. J. American Pharm. Assoc. vol. 49:7.

*Primary Examiner*—Neil McCarthy
*Attorney, Agent, or Firm*—Alexander D. Ricci; Steven D. Boyd

[57] ABSTRACT

The present invention is directed to a method of detoxifying water containing quaternary ammonium compounds to the extent that aquatic life such as fish and macroinvertebrates are protected. The method comprises adding to an aqueous system including a quaternary ammonium compound a sufficient quantity of a de-oiled lecithin. De-oiled lecithin is a mixture of phosphatides with about 2% or less residual oil.

8 Claims, No Drawings

5,518,636

METHODS OF DETOXIFYING QUATERNARY AMMONIUM COMPOUNDS TOWARD AQUATIC ORGANISMS

FIELD OF THE INVENTION

The present invention relates to the detoxification of quaternary ammonium compounds with regards to aquatic organisms. More particularly, the present invention relates to a process which employs de-oiled lecithin to reduce the toxicity of quaternary ammonium compounds sufficiently to protect aquatic organisms.

BACKGROUND OF THE INVENTION

Quaternary ammonium compounds represent an important class of cationic surface-active agents which are used in a variety of commercial products. Quaternary ammonium compounds have a positively charged nitrogen atom and at least one hydrophobic long-chain substituent in the molecule. Quaternary ammonium compounds are exemplified by the structure:

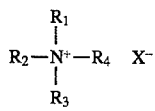

where $R_1$ is a substituted or unsubstituted alkyl or aryl group having about 6 to 24 carbons; $R_2$ is an alkyl, aryl or arylalkyl group having about 6 to 24 carbons; $R_3$ and $R_4$ represent alkyl groups having 1 to 4 carbons; and X represents an anion consisting of either a halide salt, sulfate, carbonate, acetate, and nitrate. Exemplary quaternary ammonium compounds are generally classified as monoalkyltrimethyl ammonium salts, monoalkyldimethylbenzyl ammonium salts, and dialkyldimethyl ammonium salts.

Quaternary ammonium compounds have an extremely strong affinity for negatively charged substrates. Their highly adsorptive properties make them suitable for a wide variety of commercial applications. For example, these compounds are utilized as fabric softeners, laundry detergents, anti-static sprays, flotation promoters for the mining industry, asphalt and petroleum additives, in the manufacturing of organo-modified clays (used in drilling muds). Other major uses include corrosion inhibitors and highly potent germicides/deodorizers, and biocides.

Through their intended uses, quaternary ammonium compounds ultimately end up in the aquatic environment. A majority of these compounds enter wastewater treatment facilities where they are removed or reduced by numerous mechanisms including adsorption, complexation and biodegradation to levels non-toxic to aquatic life upon their discharge to the environment. However, the uses of quaternary ammonium compounds as biocides particularly for controlling biological fouling or as corrosion inhibitors in industrial cooling water systems are often not sent to a wastewater treatment facility but are released directly to the aquatic environment. The discharge water streams from industrial cooling water systems and other aqueous systems treated by such quaternary ammonium based compounds may contain elevated residual amounts. Such releases may cause unacceptable short-term or long-term impacts to aquatic life within the receiving stream. Aquatic life referred to herein includes microbiological organisms (i.e., bacteria, fungi, and algae), fish, planktonic and benthic macroinvertebrates, and zooplankton assemblages living within streams, rivers, lakes, reservoirs, estuaries, and oceans. Quaternary ammonium compounds may be acutely toxic to specific aquatic organisms at concentrations as low as 10 ug/L.

Concerns with respect to such discharge of quaternary ammonium compounds and other toxic waste products into the aquatic environment has grown significantly in recent years. This growing concern is manifested, in part, in the actions of municipal, state and federal environmental regulatory authorities who have either already enacted legislation to eliminate the pollution of our natural waters or who are in the process of promulgating such regulations. The regulations and legislation enacted by such authorities are becoming more and more stringent with the ultimate goal being the prohibition of the addition of any chemical compound into the aquatic environment which has even an insignificant effect on the aquatic life which exists therein.

In response to such legislation, industrial users of large volumes of water have sought out methods of decreasing effluent toxicity. For example, U.S. Pat. No. 3,524,812 teaches a method of decreasing the biocidal effects of bromonitrostyrene by reaction with a compound selected from a water soluble sulfite compound, hydrogen peroxide, and potassium permanganate. U.S. Pat. No. 4,204,954 teaches the use of anionic substances such as sodium stearate, sodium dodecylsulfate, dodecylglycine, dodecylaminoethylglycine, sodium palmitate, sodium oleate, sodium linoleate, and sodium dioctylsulfosuccinate to detoxify quaternary ammonium based biocides.

The addition of clays to water treated with quaternary ammonium based biocides prior to release into the environment is known. Such materials, particularly bentonite clays, have been shown in laboratory and field tests to be effective at detoxifying quaternary ammonium based biocides. While clays have been shown to be effective treatments for the detoxification of biocides, they are troublesome to feed. U.S. Pat. No. 5, 169,536 teaches a method of detoxifying cationic surfactant based biocides with a combination of bentonite clay detoxification agent and a polymerized alkyl naphthalene sulfonate sodium salt dispersing agent. While clay based detoxification methods are effective, regulatory agencies have shown concern over the long term deposition and accumulation of inert clays and their environmental impact.

The use of soya lecithin (a mixture of phosphatides and lipids) in combination with a dispersing agent such as Tween® 80 (a polyoxyethylene sorbitan monooleate) in water to neutralize quaternary bactericides is known in the art (Tween is a registered trademark of ICI United States, Inc. ). It is believed that soya lecithin acts as the neutralizer while Tween 80 is used as a dispersing and solubilizing agent for the soya lecithin which is insoluble in water. While this material has been utilized for neutralizing the toxicity of quaternary ammonium antimicrobials towards microorganisms such as bacteria, it has not been suggested that soya lecithin would be effective at protecting higher orders of aquatic life such as fish, plaktonic and benthic macroinvertebrates and zooplankton assemblages. Within the scope of the present invention, higher orders of aquatic life refers to life forms such as macroinvertebrates and fish.

SUMMARY OF THE INVENTION

The present inventors found that de-oiled lecithin is able to detoxify quaternary ammonium compounds to an extent that higher orders of aquatic life such as fish and macroinvertebrates were protected. Because of critical differences between microorganisms such as bacteria, fungi and algae and higher orders of aquatic life such as fish and macroinvertebrates, the toxicity of quaternary ammonium compounds differ. It was discovered that de-oiled lecithin was effective at neutralizing the acute toxicity of quaternary ammonium compounds toward higher orders of aquatic life. Other conventional bactericide neutralizing agents which are effective neutralizing agents with respect to microorganisms were found to be ineffective with respect to higher orders of aquatic life.

DESCRIPTION OF THE PREFERRED EMBODIMENTS

The present inventors discovered that de-oiled lecithin is effective at neutralizing the toxicity of quaternary ammonium compounds towards higher orders of aquatic life. Phosphatide compounds such as lecithin are found in all living organisms. Lecithin consists of a variety of phosphatide compounds such as phosphatidylcholine, phosphatidylethanolamine (cephalin), phosphatidylinositol and phosphatidic acid. Commercially, the majority of lecithin produced is derived primarily from soybeans (soya lecithin). Soya lecithin is produced through a solvent extraction process as a by-product of soybean oil manufacture. Typically, soya lecithin is sold as a liquid that contains a small proportion of residual soybean oil that renders the product insoluble in water. De-oiled lecithin is derived by removing the majority of residual oil leaving only 1 to 2% oil remaining. This produces a granule or powder that is water dispersible forming a stable colloidal suspension. Thus, de-oiled lecithin can be described as a phosphatide mixture with about 2% or less residual oil.

The ability of de-oiled lecithin to neutralize the toxicity of quaternary ammonium compounds towards higher orders of aquatic life was evaluated in several acute toxicity evaluations. The bioassays were conducted in accordance with USEPA testing guidelines. The two testing organisms used were the macroinvertebrate, *Daphnia magna*, as well as the fathead minnow, *Pimephales promelas*. These test organisms are also highly sensitive to quaternary ammonium compounds when compared to microorganisms such as bacteria. For example, a standard 48 hour static-acute bioassay using n-Alkyl (50% $C_{14}$, 40% $C_{12}$, 10% $C_{16}$) dimethyl benzyl ammonium chloride (ADBAC) towards *Daphnia magna* generated a $LC_{50}$ (lethal concentration where 50% of the organisms were killed) of approximately 0.02 milligrams per liter. This is in sharp contrast to the $LC_{50}$ of 35.0 milligrams per liter generated on the same compound toward the gram-negative bacteria, *Pseudomonas sp*. The significant difference in toxicity shows the importance of discerning between neutralization towards microorganisms verses higher orders of life forms such as aquatic life.

The following bioassay results show that commercial soya lecithin as well as various other microorganism neutralization materials were ineffective at detoxifying quaternary ammonium compounds toward higher order of aquatic life. It was also discovered that de-oiled lecithin (a phosphatide mixture with about 2% residual oil) effectively detoxified quaternary ammonium compounds toward higher orders of aquatic life. The de-oiled lecithin is added in amounts sufficient to detoxify the quaternary ammonium compounds present. The required treatment rate will vary depending on the quaternary ammonium compound concentration. Typically, the de-oiled lecithin will be added in a ratio of de-oiled lecithin to quaternary ammonium compound of from about 1 to 1 to about 150 to 1.

EXAMPLES

The bioassay procedure was as follows: *Daphnia magna* neonates (less than 24 hours old) were exposed to 1.0 mg per liter of n-Alkyl (50% $C_{14}$, 40% $C_{12}$, 10% $C_{16}$) dimethyl benzyl ammonium chloride (ADBAC) combined with various "inactivators" in concentrations ranging from 1 to 100 mg per liter. All test solutions were prepared in dechlorinated domestic drinking water as the diluent. Twenty *Daphnia magna* neonates, ten individuals per replicate test beaker, were exposed to each test solution for 48 hours under static conditions. The toxicity tests were conducted in 250 ml glass beakers containing approximately 200 ml of test solution. The toxicity tests were performed at 20° C. and the test organisms were not fed during this period. Mortality observations were recorded at 24 hour intervals for the duration of the toxicity tests. The toxicity tests were performed in accordance with U.S. Environmental Protection Agency Guidelines.

Examples 1–4

Anionic monomeric surfactants including sodium oleate, sodium stearate, sodium dodecyl sulfate and sodium dioctyl sulfosuccinate were tested for their ability to detoxify ADBAC. As shown in Tables I through IV all *Daphnia magna* died in each test solution.

TABLE I

Sodium Dioctyl Sulfosuccinate: *Daphnia magna*

| ADBAC concentration (mg/L) | Sodium Dioctyl Sulfosuccinate(mg/L) | Treatment Ratio | Cumulative % Mortality after 48 hours |
|---|---|---|---|
| 1.0 | 0 | 1:0 | 100% |
| 1.0 | 1 | 1:1 | 100% |
| 1.0 | 2 | 1:2 | 100% |
| 1.0 | 5 | 1:5 | 100% |
| 1.0 | 10 | 1:10 | 100% |
| 0.0 | 10 | 0:10 | 5% |
| 0.0 | 0 | 0:0 | 0% |

TABLE II

Sodium Stearate: *Daphnia magna*

| ADBAC concentration (mg/L) | Sodium Stearate Concentration(mg/L) | Treatment Ratio | Cumulative % Mortality after 48 hours |
|---|---|---|---|
| 1.0 | 0 | 1:0 | 100% |
| 1.0 | 2.5 | 1:2.5 | 100% |
| 1.0 | 5 | 1:5 | 100% |
| 1.0 | 10 | 1:10 | 100% |
| 1.0 | 20 | 1:20 | 100% |
| 1.0 | 40 | 1:40 | 100% |
| 0.0 | 40 | 0:40 | 5% |
| 0.0 | 0.0 | 0:0 | 0% |

TABLE III

Sodium Oleate: *Daphnia magna*

| ADBAC concentration (mg/L) | Sodium Oleate Concentration(mg/L) | Treatment Ratio | Cumulative % Mortality after 48 hours |
|---|---|---|---|
| 1.0 | 0 | 1:0 | 100% |
| 1.0 | 2.5 | 1:2.5 | 100% |
| 1.0 | 5 | 1:5 | 100% |
| 1.0 | 10 | 1:10 | 100% |

TABLE III-continued

Sodium Oleate: *Daphnia magna*

| ADBAC concentration (mg/L) | Sodium Oleate Concentration (mg/L) | Treatment Ratio | Cumulative % Mortality after 48 hours |
|---|---|---|---|
| 1.0 | 20 | 1:20 | 100% |
| 1.0 | 40 | 1:40 | 100% |
| 0.0 | 40 | 0:40 | 95% |
| 0.0 | 0.0 | 0:0 | 0% |

TABLE IV

Sodium Dodecyl Sulfate: *Daphnia magna*

| ADBAC concentration (mg/L) | Sodium Dodecyl Sulfate (mg/L) | Treatment Ratio | Cumulative % Mortality after 48 hours |
|---|---|---|---|
| 1.0 | 0 | 1:0 | 100% |
| 1.0 | 2.5 | 1:2.5 | 100% |
| 1.0 | 5 | 1:5 | 100% |
| 1.0 | 10 | 1:10 | 100% |
| 1.0 | 20 | 1:20 | 100% |
| 1.0 | 40 | 1:40 | 100% |
| 0.0 | 40 | 0:40 | 100% |
| 0.0 | 0.0 | 0:0 | 0% |

Examples 5 through 8

The efficacy of various types of lecithin at detoxifying ADBAC toward higher orders of aquatic life was evaluated. Inactivators consisting of: a blend of soya lecithin and Tween 80, hydroxylated soya lecithin, and de-oiled soya lecithin were tested for their ability to detoxify ADBAC. As shown in Tables V through VIII, only de-oiled soya lecithin was effective at detoxifying ADBAC toward aquatic life.

TABLE V

Soya Lecithin/Tween 80*: *Daphnia magna*

| ADBAC (mg/L) | Soya Lecithin/Tween 80* (mg/L) | Treatment Ratio | Cumulative % Mortality after 48 hours |
|---|---|---|---|
| 1.0 | 0 | 1:0 | 100% |
| 1.0 | 10 | 1:10 | 100% |
| 1.0 | 20 | 1:20 | 100% |
| 1.0 | 40 | 1:40 | 100% |
| 1.0 | 80 | 1:80 | 100% |
| 1.0 | 160 | 1:160 | 85% |
| 0.0 | 160 | 0:160 | 0% |
| 0.0 | 0.0 | 0:0 | 0% |

*Blend consisted of 2% soya lecithin and 3% Tween 80.

TABLE VI

Hydroxylated Soya Lecithin**: *Daphnia magna*

| ADBAC (mg/L) | Hydroxylated Soya Lecithin (mg/L) | Treatment Ratio | Cumulative % Mortality after 48 hours |
|---|---|---|---|
| 1.0 | 0 | 1:0 | 100% |
| 1.0 | 10 | 1:10 | 100% |
| 1.0 | 20 | 1:20 | 100% |
| 1.0 | 40 | 1:40 | 100% |
| 1.0 | 80 | 1:80 | 100% |
| 0.0 | 40 | 0:40 | 40% |
| 0.0 | 80 | 0:80 | 100% |

TABLE VI-continued

Hydroxylated Soya Lecithin**: *Daphnia magna*

| ADBAC (mg/L) | Hydroxylated Soya Lecithin (mg/L) | Treatment Ratio | Cumulative % Mortality after 48 hours |
|---|---|---|---|
| 0.0 | 0.0 | 0:0 | 0% |

**Sold under the trade name of Centrolene A by Central Soya Company.

TABLE VII

De-oiled Soya Lecithin*: *Daphnia magna* (Test 1)

| ABAC (mg/L) | De-oiled Soya Lecithin (mg/L) | Treatment Ratio | Cumulative % Mortality after 48 hours |
|---|---|---|---|
| 1.0 | 0 | 1:0 | 100% |
| 1.0 | 10 | 1:10 | 100% |
| 1.0 | 20 | 1:20 | 100% |
| 1.0 | 30 | 1:30 | 100% |
| 1.0 | 50 | 1:50 | 25% |
| 1.0 | 75 | 1:75 | 0% |
| 1.0 | 100 | 0:100 | 0% |
| 0.0 | 100 | 0:100 | 0% |
| 0.0 | 0.0 | 0:0 | 0% |

*Sold by Fisher Scientific; Granular de-oiled lecithin.

TABLE VIII

De-oiled Soya Lecithin**: *Daphnia magna* (Test 2)

| ABAC (mg/L) | De-oiled Soya Lecithin (mg/L) | Treatment Ratio | Cumulative % Mortality after 48 hours |
|---|---|---|---|
| 1.0 | 0 | 1:0 | 100% |
| 1.0 | 20 | 1:20 | 100% |
| 1.0 | 30 | 1:30 | 100% |
| 1.0 | 40 | 1:40 | 85% |
| 1.0 | 50 | 1:50 | 35% |
| 1.0 | 60 | 1:60 | 0% |
| 1.0 | 70 | 1:70 | 0% |
| 1.0 | 80 | 1:80 | 0% |
| 0.0 | 0.0 | 0:0 | 0% |

**Sold under the trade name of ALCOLEC F-100 by American Lecithin Company.

Example 9

A toxicity test using the fathead minnow *Pimephales promelas* was undertaken. Young fathead minnows (less than 14 days old) were exposed to 1.0 mg per liter of ADBAC in combination with various levels of de-oiled soya lecithin ranging from 5 to 60 mg per liter. All test solutions were prepared in dechlorinated domestic drinking water as the diluent. 20 fish, 10 individuals per replicate test beaker, were exposed to each test solution for 96 hours under static non-renewal conditions. The toxicity tests were conducted in 400 ml glass beakers containing approximately 300 ml of test solution. The tests were performed at 20° C. and the test organisms were not fed during the period. Mortality observations were recorded at 24 hour intervals through the duration of the 96 hour test. Table IX summarizes the results. From Table IX it can be seen that a treatment ratio of 1:20, ADBAC quat:de-oiled lecithin was non-toxic toward fathead minnows.

TABLE IX

| | De-oiled Soya Lecithin: *Pimephales promelas* | | |
|---|---|---|---|
| ABAC (mg/L) | De-oiled Soya Lecithin* (mg/L) | Treatment Ratio | Cumulative % Mortality after 48 hours |
| 1.0 | 0 | 1:0 | 100% |
| 1.0 | 5 | 1:5 | 20% |
| 1.0 | 10 | 1:10 | 30% |
| 1.0 | 20 | 1:20 | 0% |
| 1.0 | 40 | 1:40 | 0% |
| 1.0 | 60 | 1:60 | 5% |
| 0.0 | 0.0 | 0:0 | 0% |

*Sold under the trade name of ALCOLEC F-100 by American Lecithin Company.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of detoxifying water containing quaternary ammonium compounds toxic to higher orders of aquatic life consisting essentially of adding thereto at least a neutralizing amount of a lecithin having about 2% or less residual oil.

2. The method of claim 1 wherein said lecithin is de-oiled soya lecithin.

3. The method of claim 1 wherein said quaternary ammonium compounds are selected from the group consisting of monoalkyltrimethyl ammonium salts, monoalkyldimethyl benzyl ammonium salts and dialkyldimethyl ammonium salts.

4. The method of claim 1 wherein said lecithin is added to said water in a ratio of lecithin to quaternary ammonium compound of from about 1 to 1 to about 150 to 1.

5. A method of decreasing the toxic effects of quaternary ammonium compounds in aqueous solutions toward higher orders of aquatic life which comprises adding thereto a sufficient quantity for the purpose of a lecithin having about 2% or less residual oil.

6. The method of claim 5 wherein said lecithin is de-oiled soya lecithin.

7. The method of claim 5 wherein said quaternary ammonium based biocide is selected from the group consisting of monoalkyltrimethyl ammonium salts, monoalkyldimethyl benzyl ammonium salts and dialkyldimethyl ammonium salts.

8. The method of claim 5 wherein said lecithin is added to said aqueous solution in a ratio of phosphatide mixture to quaternary ammonium compounds of from about 1 to 1 to about 150 to 1.

* * * * *